(12) United States Patent
Yang

(10) Patent No.: US 11,189,997 B2
(45) Date of Patent: Nov. 30, 2021

(54) CABLE FIXING DEVICE

(71) Applicant: HYUNDAI MOBIS CO., LTD., Seoul (KR)

(72) Inventor: Hae Jun Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 103 days.

(21) Appl. No.: 16/521,883

(22) Filed: Jul. 25, 2019

(65) Prior Publication Data

US 2020/0052475 A1 Feb. 13, 2020

(30) Foreign Application Priority Data

Aug. 13, 2018 (KR) .................. 10-2018-0094141

(51) Int. Cl.
| | |
|---|---|
| *H02G 3/00* | (2006.01) |
| *H02G 3/32* | (2006.01) |
| *B60K 7/00* | (2006.01) |
| *B60R 16/02* | (2006.01) |
| *H01B 17/56* | (2006.01) |

(52) U.S. Cl.
CPC ............ *H02G 3/32* (2013.01); *B60K 7/0007* (2013.01); *B60R 16/02* (2013.01); *H01B 17/56* (2013.01)

(58) Field of Classification Search
CPC ....... F16L 3/1233; H01R 4/643; H05K 3/429; H05K 1/115; H02G 3/0431; H02G 3/045
See application file for complete search history.

(56) References Cited

U.S. PATENT DOCUMENTS

| | | | | |
|---|---|---|---|---|
| 3,531,071 | A * | 9/1970 | Kubli | F16L 3/2235 |
| | | | | 248/68.1 |
| 4,020,531 | A * | 5/1977 | Ahrens | F16L 3/1008 |
| | | | | 24/284 |
| 5,121,946 | A * | 6/1992 | Jardine | F16L 55/172 |
| | | | | 285/15 |
| 5,184,794 | A * | 2/1993 | Saito | F16L 3/13 |
| | | | | 248/316.5 |
| 5,284,267 | A * | 2/1994 | Polletta | F02D 19/027 |
| | | | | 220/4.14 |
| 5,992,802 | A * | 11/1999 | Campbell | H02G 3/30 |
| | | | | 248/68.1 |
| 8,038,104 | B1 * | 10/2011 | Larkin | H02G 3/32 |
| | | | | 248/55 |
| 9,297,479 | B2 * | 3/2016 | Kato | F16L 3/12 |
| 2017/0030487 | A1 * | 2/2017 | Sampson | B60R 16/0215 |
| 2019/0237216 | A1 * | 8/2019 | Uchiyama | H01B 9/02 |

* cited by examiner

*Primary Examiner* — Pete T Lee
(74) *Attorney, Agent, or Firm* — NSIP Law

(57) ABSTRACT

A cable fixing device may include: a first bracket fixed to a housing of an in-wheel driving device, and installed in a shape to cover one side of a cable; a second bracket positioned on the other side of the cable, and fixed to the first bracket; and a buffer installed on at least any one of the first and second brackets, and made of an elastic material to distribute stress transferred to the cable.

12 Claims, 6 Drawing Sheets

CABLE FIXING DEVICE

CROSS-REFERENCES TO RELATED APPLICATIONS

The present application claims priority to Korean application number 10-2018-0094141, filed on Aug. 13, 2018, which is incorporated by reference in its entirety.

BACKGROUND OF THE INVENTION

The present invention relates to a cable fixing device, and more particularly, to a cable fixing device capable of reducing concentration of tension and stress applied to a cable of an in-wheel driving device.

In general, a cable used in an in-wheel driving device or vehicle performs a function of transferring an electrical signal or supplying power. In order to fix the cable to the vehicle body or the in-wheel driving device, a separate bracket is installed.

However, since a separate buffer is not provided for the bracket for fixing the cable, the cable may be damaged by concentration of tension or stress which is transferred to the cable due to upward/downward movement or side-to-side movement of a suspension. Therefore, there is a demand for a structure capable of solving the problem.

SUMMARY OF THE INVENTION

Embodiments of the present invention are directed to a cable fixing device capable of reducing concentration of tension and stress applied to a cable of an in-wheel driving device.

In one embodiment, a cable fixing device may include: a first bracket fixed to a housing of an in-wheel driving device, and installed in a shape to cover one side of a cable; a second bracket positioned on the other side of the cable, and fixed to the first bracket; and a buffer installed on at least any one of the first and second brackets, and made of an elastic material to distribute stress transferred to the cable.

The first bracket may include: a first body fixed to the outside of the housing, and extended in a linear direction; and one or more first seating grooves formed at a side surface of the first body, facing the cable, such that the cable is seated in the first seating groove.

The plurality of first seating grooves may be installed along the first body.

The second bracket may include a second body facing the first body and extended in a linear direction.

The buffer may include: a first buffer installed outside the first seating groove and the first body; and a second buffer installed on the second body facing the first buffer.

The first buffer may include: a first curved body installed outside the first seating groove; and a first stress distribution groove formed on one side of the first curved body, facing the cable, in order to distribute stress.

The first stress distribution groove may be formed in a grid shape.

The second buffer may include: a second curved body installed at a position facing the first curved body, and contacted with the outside of the cable; and a second stress distribution groove formed on one side of the second curved body, facing the cable, in order to distribute stress.

The second stress distribution groove may be formed in a grid shape.

The first buffer may further include a coupling groove formed at a surface facing the second buffer, and the second buffer may further include a coupling protrusion protruding toward the coupling groove.

In accordance with the embodiment of the present invention, the buffer installed in a shape to cover the outside of the cable can distribute stress applied to the cable, thereby improving the durability of the cable.

Furthermore, since the first and second brackets are fixed in a state where the cable having a terminal installed thereon is positioned between the first and second brackets, the operation for fixing the cable can be rapidly and easily performed.

Furthermore, since the plurality of cables are fixed between the first and second brackets installed outside the in-wheel driving device, it is possible to save the time required for fixing the cable.

DESCRIPTION OF SPECIFIC EMBODIMENTS

Hereafter, a cable fixing device in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
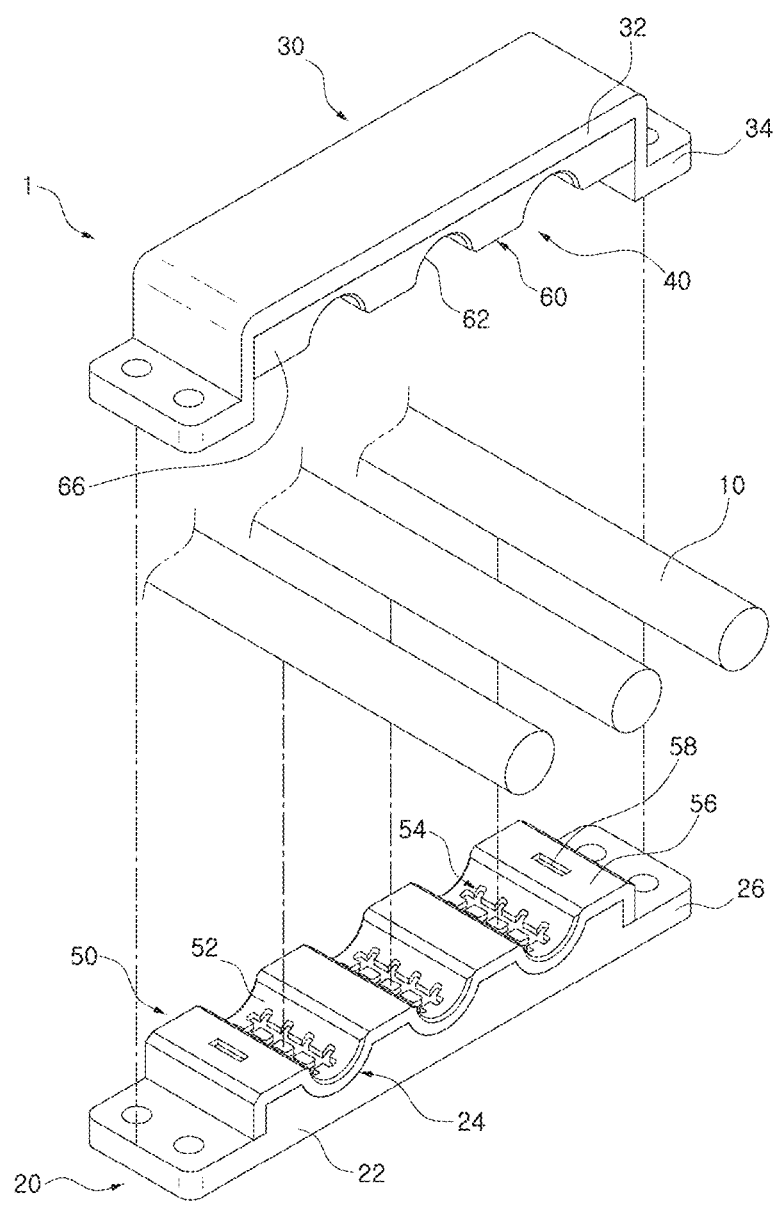
FIGS. 1 and 2 are exploded perspective views of a cable fixing device in accordance with an embodiment of the present invention.
Figure 2:
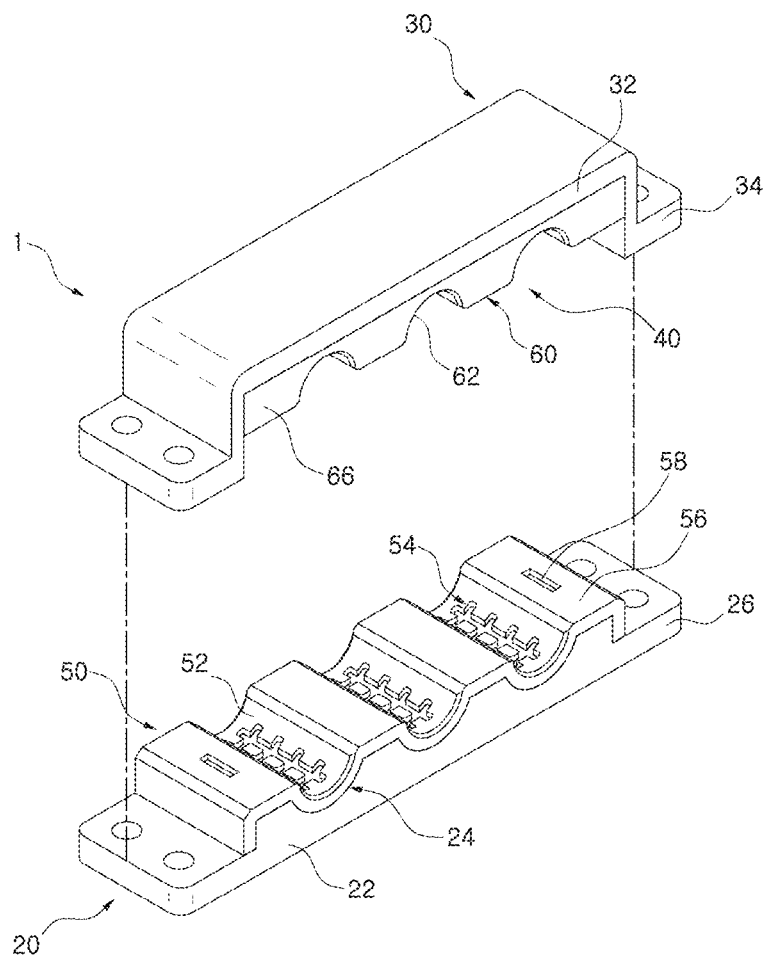
Figure 3:
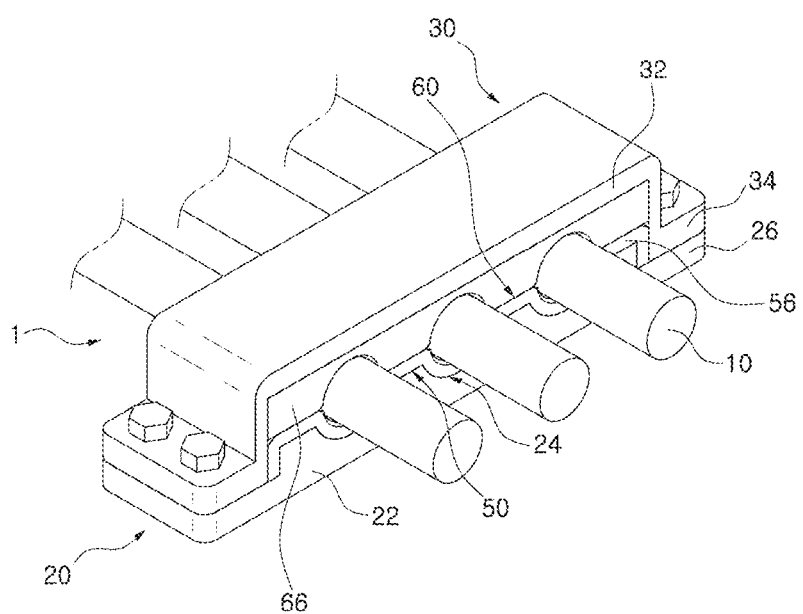
FIG. 3 is a perspective view illustrating that a cable is installed in the cable fixing device in accordance with the embodiment of the present invention.
Figure 4:
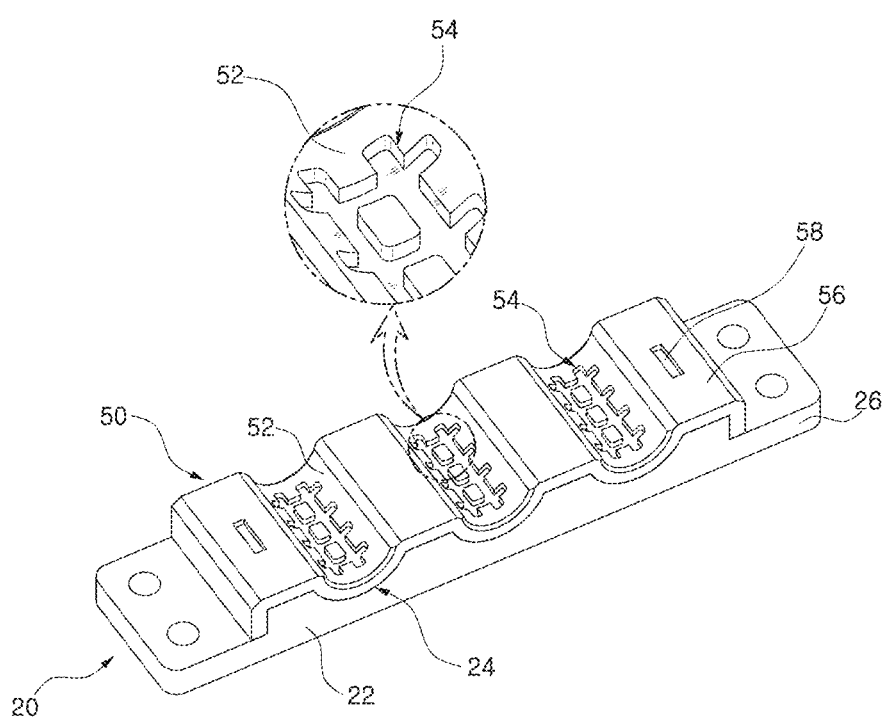
FIG. 4 is a perspective view illustrating a first bracket and a first buffer in accordance with the embodiment of the present invention.
Figure 5:
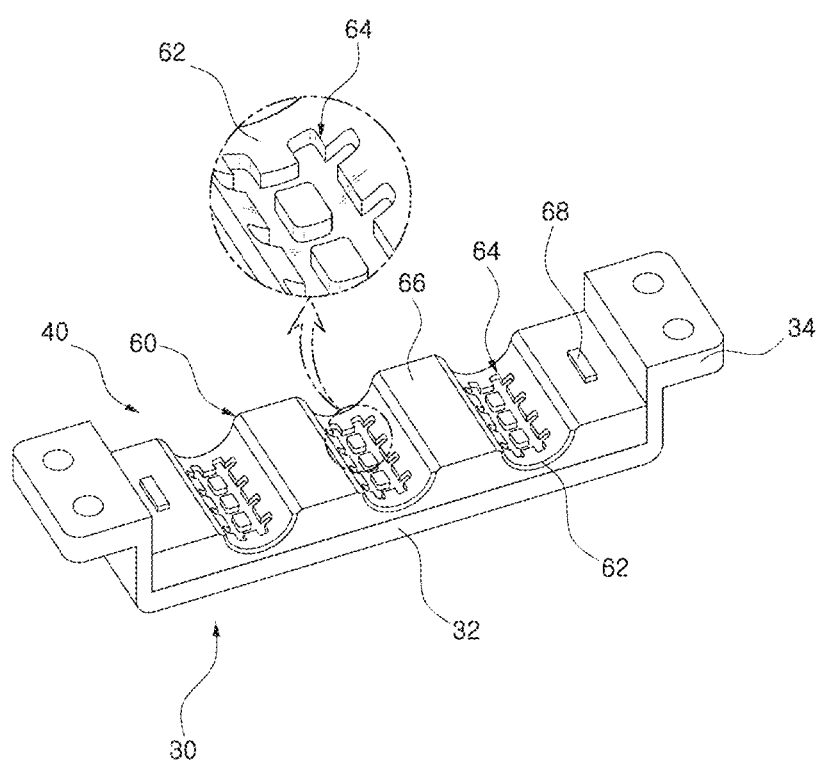
FIG. 5 is a perspective view illustrating a second bracket and a second buffer in accordance with the embodiment of the present invention.
Figure 6:
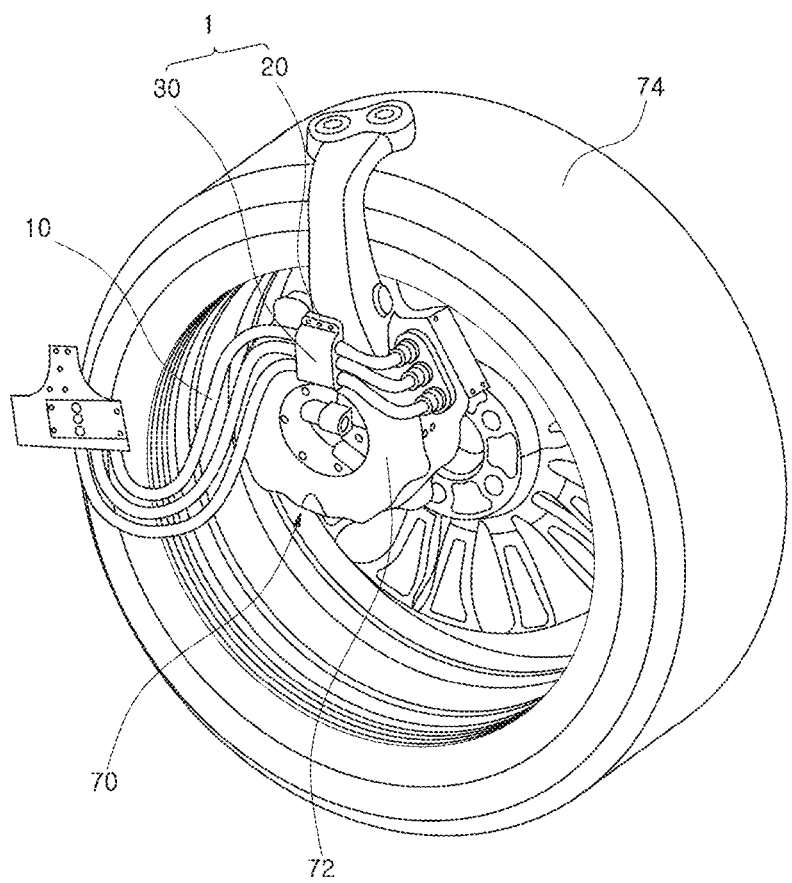
FIG. 6 is a perspective view illustrating that the cable fixing device in accordance with the embodiment of the present invention is installed in a housing of an in-wheel driving device.

FIGS. 1 and 2 are exploded perspective views of a cable fixing device in accordance with an embodiment of the present invention, FIG. 3 is a perspective view illustrating that a cable is installed in the cable fixing device in accordance with the embodiment of the present invention, FIG. 4 is a perspective view illustrating a first bracket and a first buffer in accordance with the embodiment of the present invention, FIG. 5 is a perspective view illustrating a second bracket and a second buffer in accordance with the embodiment of the present invention, and FIG. 6 is a perspective view illustrating that the cable fixing device in accordance with the embodiment of the present invention is installed in a housing of an in-wheel driving device.

As illustrated in FIGS. 1 to 6, the cable fixing device 1 in accordance with the embodiment of the present invention may include a first bracket 20, a second bracket 30 and a buffer 40. The first bracket 20 may be fixed to a housing 72 of an in-wheel driving device 70 and installed in a shape to cover one side of the cable 10, the second bracket 30 may be positioned at the other side of the cable 10 and fixed to the first bracket 20, and the buffer 40 may be installed on at least any one of the first and second brackets 20 and 30, and made of an elastic material to distribute stress transferred to the cable 10.

The first bracket 20 may be modified in various shapes, as long as the first bracket 20 is fixed to the housing 72 of the in-wheel driving device 70 and installed in a shape to cover the one side of the cable 10. The first bracket 20 in accordance with the embodiment of the present invention may include a first body 22, one or more first seating grooves 24 and a first extension member 26.

The first body 22 may be fixed to the outside of the housing 72, and extended in a linear direction crossing the cable 10. The first seating groove 24 may be formed at a side surface of the first body 22, facing the cable 10, such that the cable 10 can be seated therein. Since the plurality of first seating grooves 24 are installed along the first body 22, the plurality of cables 10 can be seated on the first bracket 20.

The in-wheel driving device 70 may provide rotary power to rotate a wheel 74, and the cable fixing device 1 may be installed on the housing 72 of the in-wheel driving device 70. The concentration of tension or stress applied to the cable 10 by upward/downward or side-to-side movement of a suspension of the vehicle may be reduced by the first bracket 20, the second bracket 30 and the buffer 40.

The first extension member 26 may be connected to either side of the first body 22, and a second extension member 34 positioned at either side of the second bracket 30 may be installed at a position facing the first extension member 26.

The first bracket 20 may be modified in various manners, as long as the first bracket 20 is positioned at the other side of the cable 10 and both sides of the second bracket 30 are fixed to the first bracket 20. The second bracket 30 in accordance with the embodiment of the present invention may include a second body 32 and the second extension member 34.

The second body 32 may be extended in a linear direction while facing the first body 22. The second extension member 34 facing the first extension member 26 may be installed at either side of the second body 32, and fixed by a separate bolt or fastening member.

The buffer 40 may be formed in various shapes, as long as the buffer 40 is installed on at least any one of the first and second brackets 20 and 30 and made of an elastic material to distribute stress transferred to the cable 10. The buffer 40 may be formed of synthetic resin or an elastic material. The buffer 40 can be manufactured through various methods including an insert injection-molding method or a molding coupling method.

The buffer 40 in accordance with the embodiment of the present invention may include a first buffer 50 installed outside the first seating groove 24 and the first body 22 and a second buffer 60 installed on the second body 32 facing the first buffer 50.

The first bracket 20, the second bracket 30 and the buffer 40 can be injection-molded in various shapes. The first bracket 20 and the first buffer 50 may be manufactured through various methods. For example, the first bracket 20 and the first buffer 50 may be injection-molded as one body or separately injection-molded and assembled to each other. Furthermore, the second bracket 30 and the second buffer 60 may also be manufactured through various methods. For example, the second bracket 30 and the second buffer 60 may be injection-molded as one body or separately injection-molded and assembled to each other.

The buffer 40 in accordance with the embodiment of the present invention may be formed of rubber or plastic, and insert injection-molded on the first and second brackets 20 and 30.

Furthermore, since the first and second buffers 50 and 60 have a coupling groove 58 and a coupling protrusion 68 for assembly, respectively, the first and second buffers 50 and 60 can be assembled to each other without a separate bolt member.

The coupling groove 58 of the first buffer 50 may be formed at a surface facing the second buffer 60, and the coupling protrusion 68 of the second buffer 60 may be protruded toward the coupling groove 58 and coupled to the coupling groove 58.

The first and second buffers 50 and 60 facing the cable 10 may have first and second stress distribution grooves 54 and 64, respectively, which are formed in a rib shape. Therefore, the first and second stress distribution grooves 54 and 64 may serve to induce the distribution of stress generated when the cable 10 is assembled, such that the buffer 40 absorbs the stress and tension applied to the cable 10.

The first buffer 50 in accordance with the embodiment of the present invention may include a first curved body 52, the first stress distribution groove 54, a first cover member 56 and the coupling groove 58.

The first curved body 52 may be installed outside the first seating groove 24 and have a concave groove formed therein. The first stress distribution groove 54 may be formed on one side of the first curved body 52, facing the cable 10, in order to distribute stress. The first stress distribution groove 54 in accordance with the present embodiment may be formed in a grid shape. Therefore, when the cable 10 is contacted with the outside of the first stress distribution groove 54, the first stress distribution groove 54 may be deformed to reduce vibration while distributing stress transferred to the cable 10.

The first cover member 56 may cover the outside of the first body 22 positioned between the first seating groove 24 and the adjacent first seating groove 24, or cover the outside of the first body 22 positioned between the first seating groove 24 and the first extension member 26. The first cover member 56 may be connected to the first curved body 52, and made of the same material as the first curved body 52. The coupling groove 58 may be formed in the first cover member 56 facing the second buffer 60.

The second buffer 60 in accordance with the embodiment of the present invention may include a second curved body 62, the second stress distribution groove 64, a second cover member 66 and the coupling protrusion 68.

The second curved body 62 may be installed at a position facing the first curved body 52, and contacted with the outside of the cable 10. The second curved body 62 in accordance with the embodiment of the present invention may have a concave groove formed at a surface facing the cable 10. The second cover member 66 facing the first cover member 56 may form a plane.

The second stress distribution groove 64 may be formed on one side of the second curved body 62, facing the cable 10, in order to distribute stress. The second stress distribution groove 64 may be formed in the groove of the second curved body 62 covering the upper side of the cable 10.

The second stress distribution groove 64 in accordance with the embodiment of the present invention may be formed in a grid shape. Therefore, when the cable 10 is contacted with the outside of the second stress distribution groove 64, the second stress distribution groove 64 may be deformed to reduce vibration while distributing stress transferred to the cable 10.

The second cover member 66 may be positioned between the second curved body 62 and the adjacent second curved body 62 and between the second curved body 62 and the second extension member 34. Furthermore, the second cover member 66 may be positioned inside the second body 32, and a surface of the second cover member 66, facing the first buffer 50, may be formed in a plane shape.

When the first and second brackets 20 and 30 are coupled to each other, the first and second brackets 20 and 30 may be installed in a plane shape with the first and second cover members 56 and 66 contacted with each other. The coupling protrusion 68 may be formed in the second cover member 66 facing the first cover member 56. The first cover member 56 facing the coupling protrusion 68 may have the coupling groove 58 formed therein.

That is, the first buffer 50 may have the coupling groove 58 formed therein, and the second buffer 60 facing the coupling groove 58 may have the coupling protrusion 68 formed thereon. The installation positions of the coupling groove 58 and the coupling protrusion 68 can be modified in various manners. For example, the installation positions of the coupling groove 58 and the coupling protrusion 68 may be exchanged with each other.

Therefore, the first and second buffers 50 and 60 may be primarily coupled through an operation of inserting the coupling protrusion 68 into the coupling groove 58.

In the embodiment of the present invention, it has been described that the plurality of cables 10 are installed between the first and second brackets 20 and 30, but this is only an example. Although one cable 10 is installed between the first and second brackets 20 and 30, the purpose of the present invention can be sufficiently achieved.

Furthermore, it has been described that the cable fixing device 1 is installed outside the housing 72 of the in-wheel driving device 70, but the present invention is not limited thereto. The cable fixing device 1 may be installed at various positions including the inside of the housing 72.

Hereafter, the operation state of the cable fixing device 1 in accordance with the embodiment of the present invention will be described in detail with reference to the accompanying drawings.

The first and second buffers 50 and 60 for reducing the concentration of tension or stress applied to the cable 10 may be fastened to each other in the top-to-bottom direction with the cable 10 interposed therebetween, and the first and second brackets 20 and 30 for fixing the cable 10 can be installed regardless of whether a harness of the cable 10 is provided.

The first bracket 20 may be installed on the outside of the housing 72 of the in-wheel driving device 70, and the second bracket 30 facing the first bracket 20 may be fixed to the first bracket 20 with the cable 10 interposed therebetween.

Before the second bracket 30 is fixed to the first bracket 20, the first buffer 50 may be fixed to the first bracket 20 so as to form one module, and the second buffer 60 may be fixed to the second bracket 30 so as to form another module.

After the first buffer 50 is fixed to the top of the first bracket 20 and the second buffer 60 is fixed to the bottom of the second bracket 30, the first and second buffers 50 and 60 may be coupled to each other with the cable 10 interposed therebetween. At this time, since the coupling protrusion 68 is inserted into the coupling groove 58, the first and second buffers 50 and 60 may be primarily coupled to each other.

As a fastening member such as a bolt is fixed through the first and second extension members 26 and 34 with the first and second extension members 26 and 34 facing each other, the cable fixing device 1 may be installed outside the cable 10. The cable fixing device 1 may be selectively installed on the suspension system, the vehicle body, the in-wheel driving device 70 or the like.

The cable fixing device 1 in accordance with the embodiment of the present invention may be installed in such a shape that the second buffer 60 covers the upper side of the cable 10 with the cable 10 seated on the first buffer 50. Therefore, stress concentration at the contact portion with the cable 10 may be reduced to improve the durability of the cable 10.

Furthermore, the first and second brackets 20 and 30 installed at both sides of the cable 10 may be moved toward the cable 10 and assembled to each other. Therefore, although a separate terminal is connected to the cable 10, the resultant structure may not be affected by the separate terminal.

When the cable fixing device 1 for fixing the cable 10 is installed on the vehicle body and the in-wheel driving device 70, the concentration of tension or stress applied to the cable 10 by the upward/downward movement or side-to-side movement of the suspension may be reduced by the buffer 40 included in the cable fixing device 1.

The cable fixing device 1 in accordance with the embodiment of the present invention provides a structure which can be easily assembled, because the first buffer 50 is injection-molded on the first bracket 20 separated in the vertical direction and the second buffer 60 is injection-molded on the second bracket 30.

In accordance with the embodiment of the present invention, the buffer 40 installed in a shape to cover the outside of the cable 10 can distribute stress applied to the cable 10, thereby improving the durability of the cable 10. Furthermore, since the first and second brackets 20 and 30 are fixed in a state where the cable 10 having a terminal installed thereon is positioned between the first and second brackets 20 and 30, the operation for fixing the cable 10 can be easily performed. Furthermore, since the plurality of cables 10 are fixed between the first and second brackets 20 and 30 installed outside the in-wheel driving device 70, it is possible to save the time required for fixing the cable 10.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A vehicle cable fixing system, comprising:
   a suspension system of a vehicle, wherein the suspension system is configured to undergo an up-and-down or side-to-side movement;
   a first bracket fixed to a housing of an in-wheel driving device of the vehicle, and installed in a shape to cover one side of a cable connected to the in-wheel driving vehicle;
   a second bracket positioned opposite to the first bracket with respect to the cable, and fixed to the first bracket such that tension or stress from the up-and-down or side-to-side movement of the suspension system is transferred to the cable inserted in between the first bracket and the second bracket; and
   a buffer installed on at least one of the first bracket and the second bracket, and made of an elastic material to that reduces the tension or the stress from the up-and-down or side-to-side movement of the suspension system transferred to the cable, wherein the buffer comprises a coupling groove and a coupling protrusion that is configured to be inserted into the coupling groove.

2. The vehicle cable fixing system of claim 1, wherein the first bracket comprises:

a first body fixed to outside of the housing, and extended in a linear direction; and one or more first seating grooves formed at a surface of the first body which faces the cable, such that the cable is seated in one of the first seating grooves.

3. The vehicle cable fixing system of claim 2, wherein the first seating grooves are installed on the first body.

4. The vehicle cable fixing system of claim 3, wherein the second bracket comprises a second body which faces the first body and is extended in a linear direction.

5. The vehicle cable fixing system of claim 4, wherein the buffer comprises:

a first buffer installed over the first seating grooves and the first body; and a second buffer installed on the second body facing the first buffer.

6. The vehicle cable fixing system of claim 5, wherein the first buffer comprises:

a first curved body installed over the first seating grooves; and a first stress distribution groove formed on one side of the first curved body, facing the cable, configured so as to reduce the tension or the stress.

7. The vehicle cable fixing system of claim 6, wherein the first stress distribution groove is formed in a grid shape.

8. The vehicle cable fixing system of claim 6, wherein the second buffer comprises:

a second curved body installed at a position facing the first curved body, and configured so as to be in contact with the cable; and a second stress distribution groove formed on one side of the second curved body, facing the cable, configured so as to reduce the tension or the stress.

9. The vehicle cable fixing system of claim 8, wherein the second stress distribution groove is formed in a grid shape.

10. The vehicle cable fixing system of claim 5, wherein the first buffer further comprises the coupling groove formed at a surface facing the second buffer, and the second buffer further comprises the coupling protrusion protruding toward the coupling groove.

11. The vehicle cable fixing system of claim 2, wherein:

the one or more first seating grooves comprises two or more first seating grooves;

a base of the buffer on the first bracket configured to be in contact with at least the one or more first seating grooves is shaped to match a shape of the one or more first seating grooves configured to be in contact with the base of the buffer or the first bracket; and the second bracket comprises a planar base with two walls on each end configured to house the buffer on the second bracket with a planar base which is configured to be in contact with the planar base of the second bracket when the buffer on the second bracket is installed.

12. A cable fixing system, comprising:

a vehicle suspension system configured to undergo an up-and-down or side-to-side movement;

a first bracket, fixed to a housing of an in-wheel driving device of the vehicle, and configured in a shape that covers a first side of a cable;

a second bracket positioned opposite to the first bracket with respect to the cable, and fixed to the first bracket;

a first buffer, installed on the first bracket, and comprising a first stress distribution groove; and a second buffer, installed on the second bracket, and comprising a second stress distribution groove, wherein the second stress distribution groove is formed in a grid shape.

* * * * *